United States Patent [19]
Haglund

[11] 3,866,169
[45] Feb. 11, 1975

[54] VEHICLE SIGNALLING APPARATUS
[76] Inventor: Claude R. Haglund, 7718 Pecan Wood Dr., Hitchcock, Tex. 77563
[22] Filed: Mar. 9, 1973
[21] Appl. No.: 339,950

[52] U.S. Cl. ............................. 340/79, 340/378 R
[51] Int. Cl. ............................................. B60q 1/26
[58] Field of Search ....... 340/74, 119, 87, 107, 286, 340/332, 378 A; 248/206

[56] References Cited
UNITED STATES PATENTS

| | | | |
|---|---|---|---|
| 898,915 | 9/1908 | North | 340/286 |
| 1,194,458 | 8/1916 | Yates | 340/286 |
| 2,361,412 | 10/1944 | Paulus et al. | 340/332 |
| 2,812,423 | 11/1957 | Penna | 340/87 UX |
| 2,905,925 | 9/1959 | Whiteneck | 340/119 X |
| 3,018,474 | 1/1962 | Cluck et al. | 340/332 |
| 3,021,513 | 2/1962 | Lankey | 340/286 T UX |
| 3,046,521 | 7/1962 | Cantwell et al. | 340/74 UX |
| 3,678,457 | 7/1972 | Lev | 340/107 |

FOREIGN PATENTS OR APPLICATIONS

| | | | |
|---|---|---|---|
| 79,230 | 11/1919 | Austria | 340/286 |
| 8,511 | 0/1885 | Great Britain | 340/286 |
| 7,828 | 0/1905 | Great Britain | 340/378 A |
| 360,595 | 11/1931 | Great Britain | 340/286 |
| 576,759 | 4/1946 | Great Britain | 248/206 R |

*Primary Examiner*—Donald J. Yusko
*Attorney, Agent, or Firm*—Clarence A. O'Brien & Harvey B. Jacobson

[57] ABSTRACT

The receiving unit of a remote signalling assembly is positioned on the dashboard in a towing vehicle and an elongated flexible cable extends therefrom to an external location rearwardly of the vehicle being towed. A transmitter unit connected to the cable is provided with push button signal switches for illuminating corresponding signal indicator lamps mounted on the display panels of both the receiving and transmitter units. The signalling assembly is powered by the battery in the towing vehicle to which the receiving unit is coupled.

9 Claims, 5 Drawing Figures

PATENTED FEB 1 1 1975 3,866,169

VEHICLE SIGNALLING APPARATUS

This invention relates to a remote signalling system through which the driver of a towing vehicle is given maneuvering commands, from a location rearwardly of the vehicle being towed.

Electric cable signalling systems interconnecting transmitting and receiving stations are well known and have been utilized for various purposes such as vehicle warnings, educational aids, space reservation assignments in hotels or public conveyances and for the transmission of intelligence in general. Such prior art systems have, however, been rather complex, relatively immobile and therefore unsuitable for the purposes of the present invention which deal with the problem of maneuvering towed vehicles such as trailers, mobile homes, boat carriers, etc. to a desired location.

In accordance with the present invention, a relatively simple and portable signalling system is provided to assist a driver of a towing vehicle to maneuver a towed vehicle into a desired location by transmitting commands to the driver from a guiding person located rearwardly of the towed vehicle. The signalling system includes transmitter and receiving units interconnected by an elongated, flexible cable releasably anchored by suction cups to the towing and towed vehicles at spaced locations. The receiving unit is positioned on the dashboard in the towing vehicle within view of the driver while the transmitter unit is held by the guiding person. The receiving unit may be plugged into the cigarette lighter in the towing vehicle to power the system from the vehicle battery. Labelled indicator lamps on both of the units are selectively illuminated by actuation of push button switches on the transmitter unit to transmit maneuvering commands.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
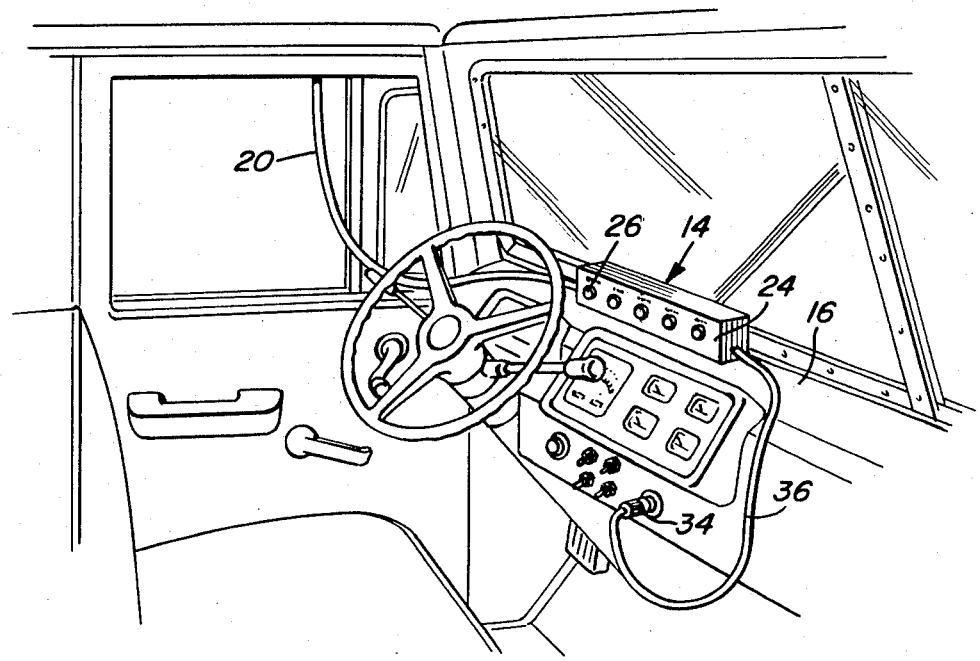
FIG. 1 illustrates the interior of a towing vehicle within which signalling apparatus is installed in accordance with the present invention.
Figure 2:
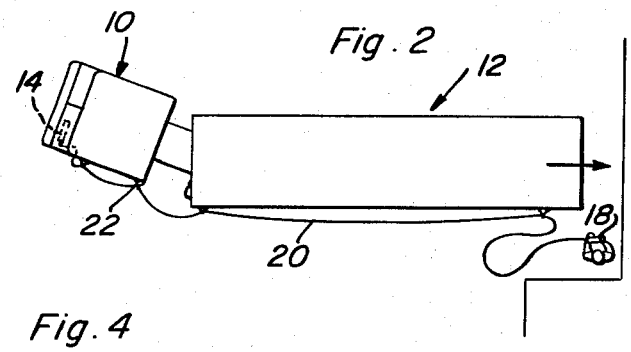
FIG. 2 is a simplified top plan view of typical towing and towed vehicles with which the signalling system is associated.
Figure 5:
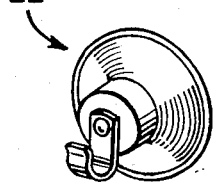
FIG. 5 is a perspective view of a cable supporting suction cup device.

Referring now to the drawings in detail, FIGS. 1 and 2 illustrate a typical installation for the signalling system of the present invention whereby the driver of a towing vehicle 10 receives commands for maneuvering a towed vehicle 12 to a desired location. The signal system includes a receiving unit 14 positioned on the dashboard 16 in the towing vehicle within view of the vehicle driver, and a transmitter unit 18 adapted to be held by a guiding person standing rearwardly of the towed vehicle. An elongated, flexible cable 20 interconnects the receiving and transmitter units and is releasably anchored to both of the vehicles 10 and 12 at spaced locations by a plurality of suction cup devices 22 as more clearly seen in FIG. 5. As shown by way of example in FIG. 2, the suction cup devices support the cable at locations above the left front door of the towing vehicle, adjacent the rear and front ends on the left sides of the towing and towed vehicles and on the rear end of the towed vehicle.

Figure 3:
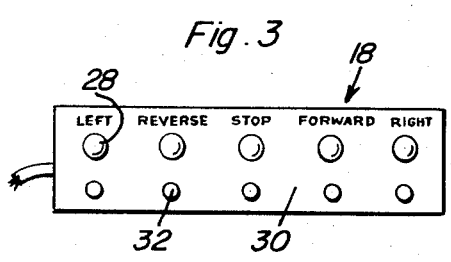
FIG. 3 is a front elevation view of a transmitter unit associated with the signalling system.

As more clearly seen in FIG. 1, the receiving unit 14 includes a housing preferably made of plastic having a display panel surface 24 mounting a plurality of signal indicator lamps 26. In the illustrated embodiment, five lamps are provided, respectively labelled by various maneuvering commands. The lamps may also be differently colored to readily distinguish the commands from each other. For example, the "left" and "right" turn command lamps may be amber colored, the "reverse" and "forward" lamps may be green and the "stop" lamp colored red. Correspondingly labelled indicator lamps 28 are mounted on the display surface 30 of a housing associated with the transmitter unit 18 as more clearly seen in FIG. 3. The transmitter unit is furthermore provided with a plurality of push button selector switches 32 underlying each of the indicator lamps 28. Actuation of each switch 32 will cause illumination of its associated indicator lamp 28 as well as a corresponding lamp 26 on the receiving unit. Power for energizing the lamps is derived from the vehicle battery in the towing vehicle to which the receiving unit is coupled by a plug-in connector 34 through the vehicle cigarette lighter as shown in FIG. 1. If no cigarette lighter is available then the power cable 36 extending from one side of the receiving unit must be directly connected to the vehicle electrical system. The elongated flexible cable 20 aforementioned extends from the other side of the receiving unit through the window.

Figure 4:
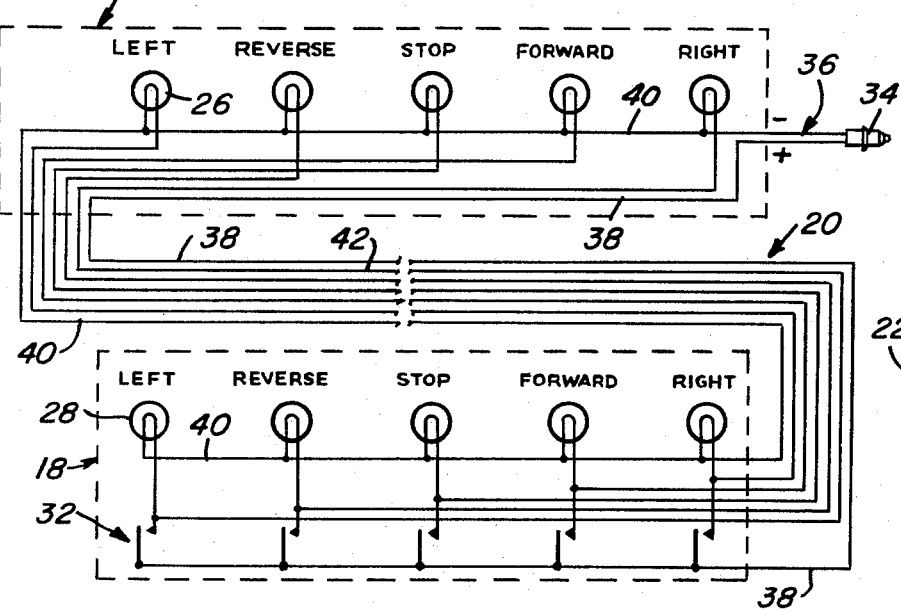
FIG. 4 is an electrical circuit diagram corresponding to the signalling system.

As shown in FIG. 4, the cable 20 in the illustrated embodiment encloses seven electrical conductors including a pair of power conductors 38 and 40 that extend from the power cable 36 and five signal conductors 42. The positive power conductor 38 is connected in parallel to each of the selector switches 32 through which energizing circuits are completed for each of the lamps 28 in parallel with the corresponding lamps 26 connected thereto by the signal conductors 42. All of the lamps are accordingly connected in parallel to the negative power conductor 40. Actuation of one or more switches 32 will therefore illuminate corresponding lamps on both the transmitter and receiving units when the receiving unit is coupled to the vehicle electrical system in order to communicate maneuvering commands that are verified at the transmitter unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A remote signalling system for transmitting maneuvering commands to a mobile land vehicle having a source of electrical energy, comprising a signal receiving device positioned within the vehicle, a transmitter device located externally of the vehicle, each of said devices mounting a plurality of corresponding signal indicators representing said maneuvering commands, elongated, flexible cable means anchored externally on said vehicle and interconnecting said devices for simultaneous energization of the corresponding indicators respectively mounted on said devices, connector means connecting said receiving device to the vehicle source of electrical energy for supply of energy to said cable means to effect said energization of the indicators, and selectively actuated means mounted on the transmitter device and connected to the cable means for selecting the corresponding indicators energized by said source in accordance with desired ones of said maneuvering commands.

2. The combination of claim 1 wherein said cable means includes a plurality of signal conductors respectively interconnecting the corresponding indicators, and a pair of power conductors respectively connected in parallel to all of the indicators and to the selectively actuated means, said power conductors being connected to the connector means.

3. The combination of claim 2 wherein said selectively actuated means comprises a plurality of push button switches interconnected between said signal conductors and one of the power conductors.

4. The combination of claim 3 wherein said signal indicators are lamps emitting light of different colors.

5. The combination of claim 1 wherein said signal indicators are lamps emitting light of different colors.

6. The combination of claim 5 wherein said selectively actuated means comprises a plurality of push button switches positioned adjacent associated indicators on the transmitter device.

7. The combination of claim 1 wherein said selectively actuated means comprises a plurality of push button switches positioned adjacent associated indicators on the transmitter device.

8. The combination of claim 1 wherein said vehicle is a towing vehicle, a second towed vehicle being coupled to the towing vehicle and means for releasably anchoring the cable means at spaced locations to the towing and towed vehicles.

9. The combination of claim 8 wherein said releasable anchoring means comprises a plurality of suction cup devices.

* * * * *